Oct. 8, 1946.  J. H. PIKUL  2,409,149
STITCH FORMATION
Original Filed Feb. 21, 1944  4 Sheets-Sheet 1
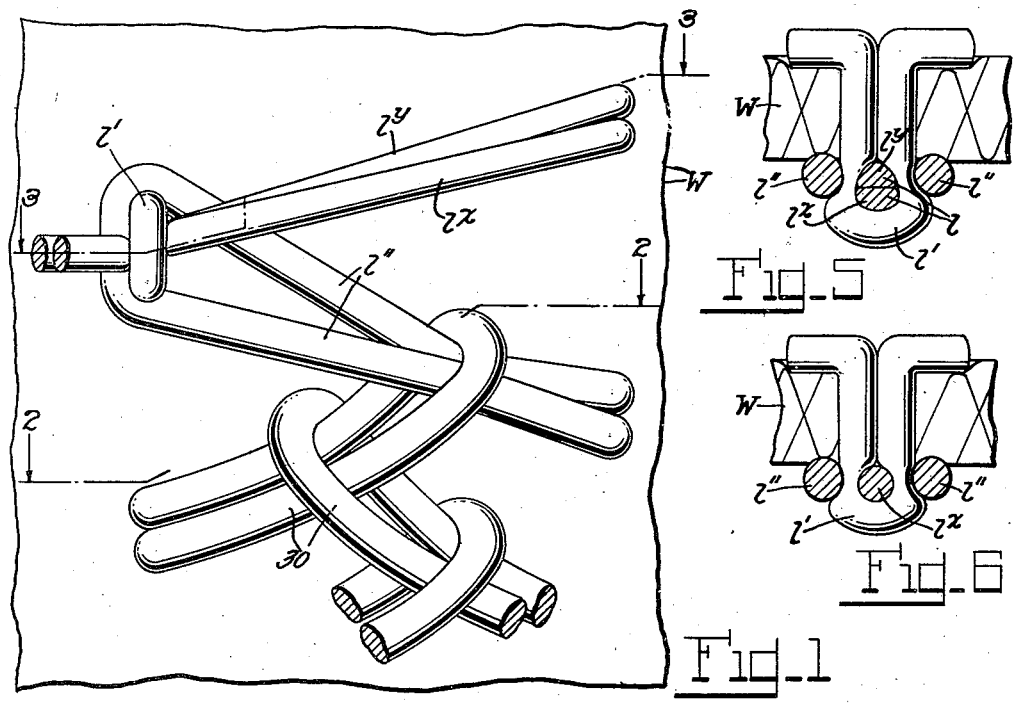
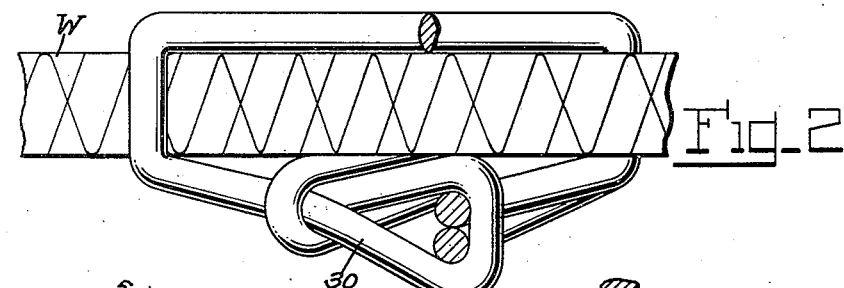
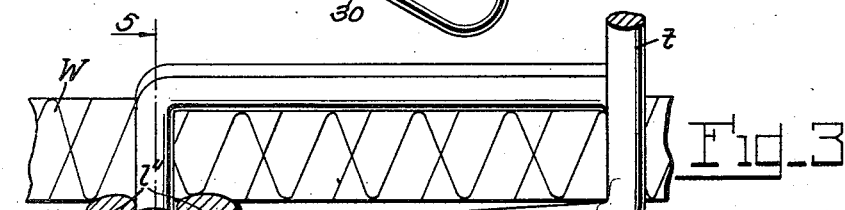
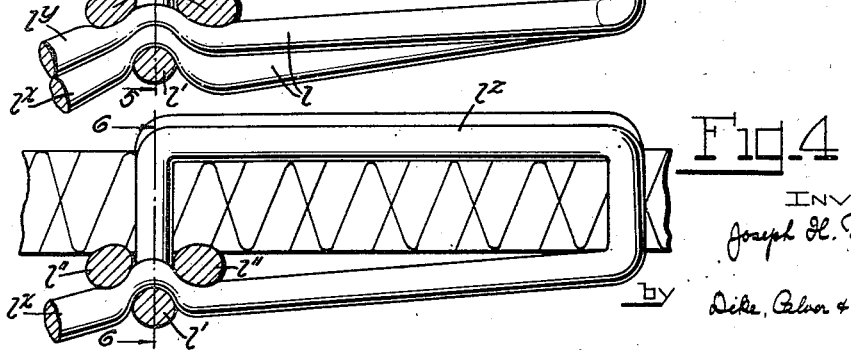

Oct. 8, 1946.  J. H. PIKUL  2,409,149
STITCH FORMATION
Original Filed Feb. 21, 1944  4 Sheets-Sheet 2
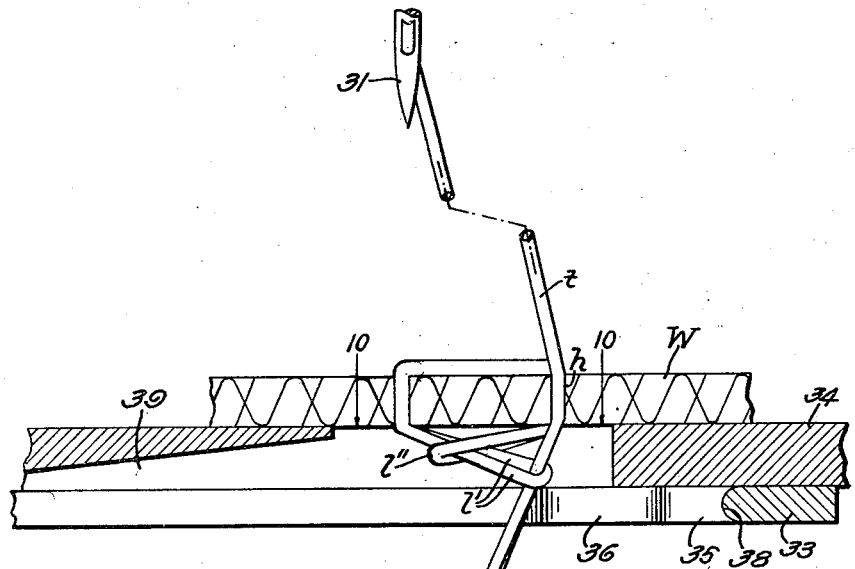
Fig. 7
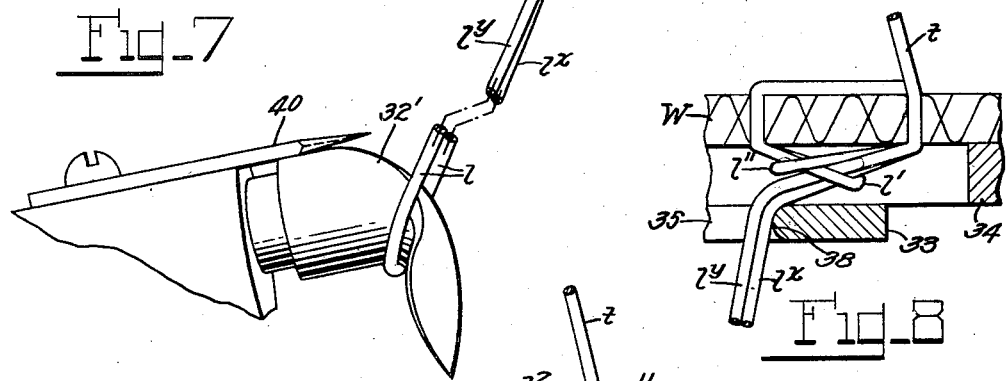
Fig. 8
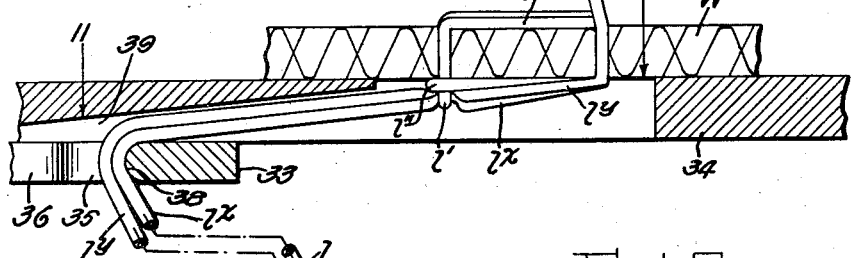
Fig. 9
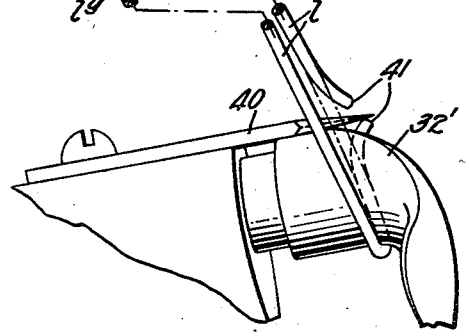
INVENTOR:
Joseph H. Pikul
by
Dike, Calver & Porter
Attys.

Oct. 8, 1946.  J. H. PIKUL  2,409,149
STITCH FORMATION
Original Filed Feb. 21, 1944  4 Sheets-Sheet 3
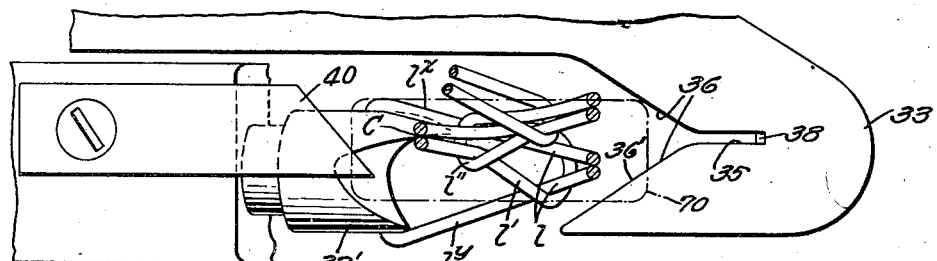
Fig.10
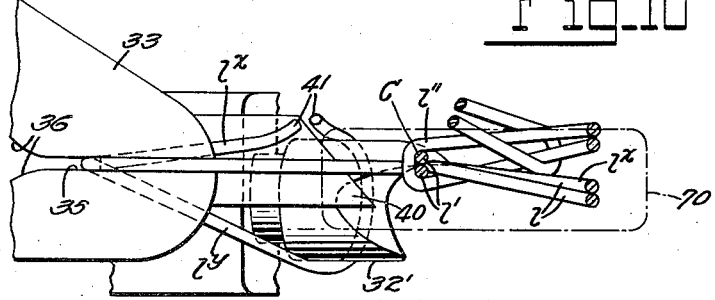
Fig.11
Fig.13
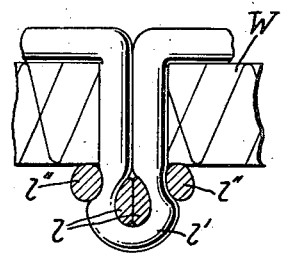
Fig.14
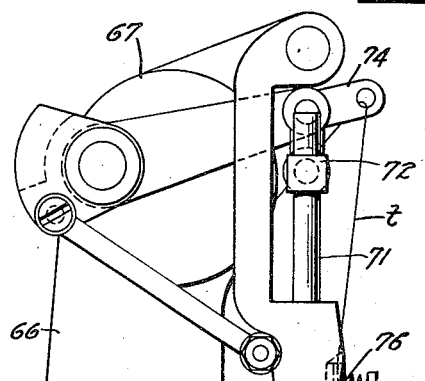
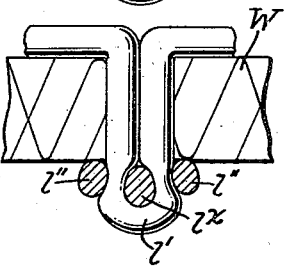
Fig.12
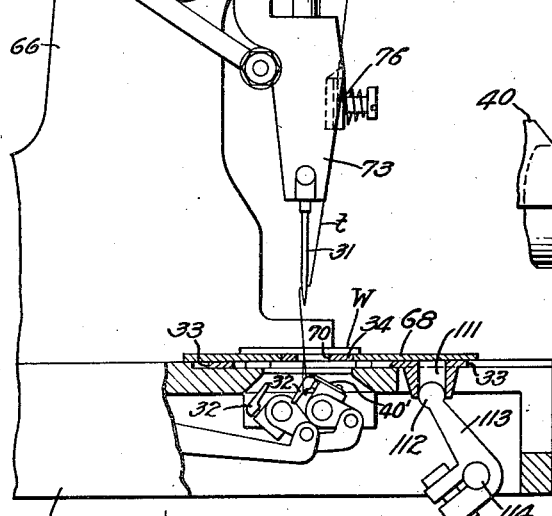
Fig.19
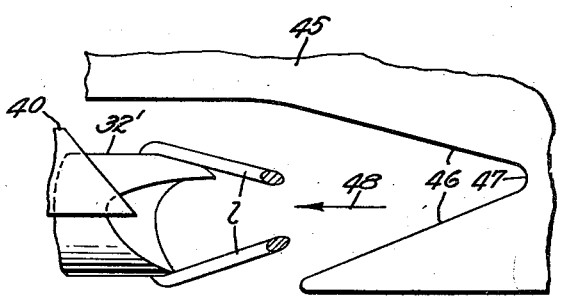
INVENTOR:
Joseph H. Pikul
Dike, Calver & Porter
Attys.

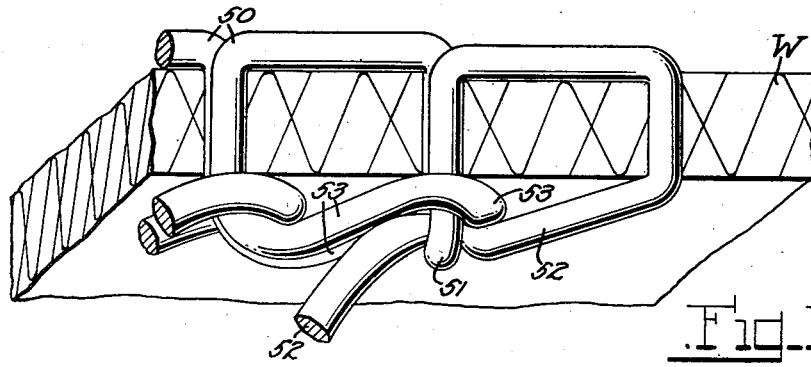
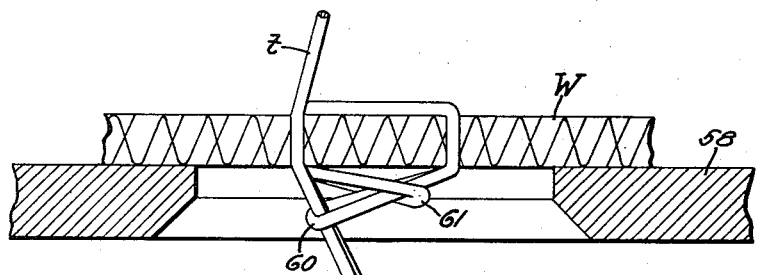
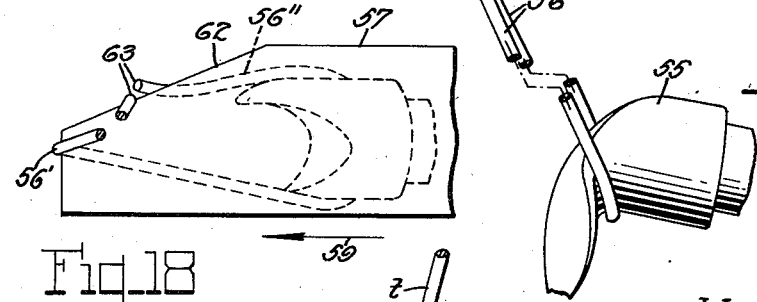
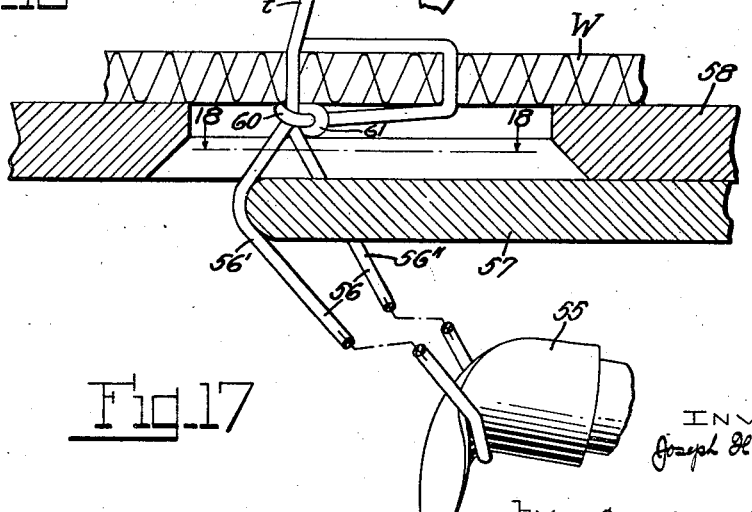

Patented Oct. 8, 1946

2,409,149

UNITED STATES PATENT OFFICE 2,409,149

STITCH FORMATION

Joseph H. Pikul, West Newton, Mass., assignor to The Reece Corporation, a corporation of Maine Original application February 21, 1944, Serial No. 523,173. Divided and this application September 11, 1944, Serial No. 553,527

4 Claims. (Cl. 112—262)

This invention relates to the art of sewing and more particularly to the formation of a tying stitch in material. The present application is a division of my copending application, Serial No. 523,173, filed February 21, 1944.

Heretofore, when chain stitches were resorted to in machine sewing, it was necessary to terminate any group of continuous chain stitches with a conventional tying stitch in order to secure the entire group of stitches against unravelling. An example of a sewing machine of this type is shown and described in my prior Patent No. 2,131,387, dated September 27, 1938. While a conventional tying stitch secures a group of chain stitches in an entirely satisfactory manner, its formation by the same instrumentalities which form the chain stitches involves at least a different operation of these instrumentalities, which complicates the machine and accordingly increases the cost of the same.

It is the primary aim and object of the present invention to secure a machine-sewed group of continuous chain stitches against unravelling by devising a terminating tying stitch the formation of which is readily accomplished by the same instrumentalities that form the chain stitches without, however, requiring a different operation of said instrumentalities.

The invention will be more clearly understood from the following description in conjunction with the accompanying drawings, in which:

Fig. 1 is a greatly magnified bottom view of a piece of material in which successive chain stitches are formed.

Fig. 2 is a section taken substantially on the line 2—2 of Fig. 1, and illustrates the conventional concatenation of the loops of a chain stitch.

Fig. 3 is a section taken substantially on the line 3—3 of Fig. 1, and shows an intermediate step in the formation of the terminating stitch of a group of chain stitches in accordance with the present invention.

Fig. 4 is a section similar to Fig. 3, showing the last stitch completed.

Figs. 5 and 6 are sections taken substantially on the lines 5—5 and 6—6, respectively, of Figs. 3 and 4, respectively.

Fig. 7 is a greatly enlarged, fragmentary sectional view of stitch-forming mechanism for forming a terminating tying stitch in accordance with the present invention.

Figs. 8 and 9 are fragmentary sectional views similar to Fig. 7, showing progressive steps in the formation of the terminating tying stitch.

Figs. 10 and 11 are fragmentary sections taken substantially on the lines 10—10 and 11—11, respectively, of Figs. 7 and 9, respectively.

Fig. 12 shows a modified element of the stitch-forming mechanism whereby a modified tying stitch is obtained.

Fig. 13 is a greatly magnified section through the partly completed, modified tying stitch, the section being similar to the section of Fig. 5.

Fig. 14 is a section similar to Fig. 13, showing the modified stitch completed.

Fig. 15 is a greatly magnified illustration of the tying stitch of the present invention at the end of a straight seam of chain stitches.

Fig. 16 is a greatly enlarged, fragmentary sectional view of a modified stitch-forming mechanism.

Fig. 17 is a fragmentary sectional view similar to Fig. 16, showing the formation of another modified tying stitch in accordance with the present invention.

Fig. 18 is a fragmentary section taken substantially on the line 18—18 of Fig. 17.

Fig. 19 is a front elevation, partly broken away, of a machine embodying the stitch-forming mechanism shown in Figs. 7 to 9.

Referring to the drawings, Fig. 1 illustrates greatly magnified the back side of a piece of material W in which successive chain stitches 30 are formed. By way of example, these stitches are shown as arranged in zig-zag fashion. The formation of the chain stitches is conventional, the machine which may be used for this purpose providing a reciprocatory and laterally vibratory needle 31 (Fig. 19) and two loopers 32 which alternately cooperate with the needle 31 in the formation of successive chain stitches. Fig. 7 illustrates a step in the normal cooperation of the needle 31 and one of the loopers 32 in the formation of the chain stitches, the looper 32' having seized the thread loop l cast by the needle 31 on its preceding ascent through the hole h in the material, and deflected it into the position shown in Fig. 7 in which said loop is in alignment with the needle in the left end position of its lateral vibration.

After the machine has sewn a group of continuous chain stitches, the needle 31 and the looper 32' will come to rest in the relative disposition shown in Fig. 7 with the last loop l held on said looper. While the last loop l is thus held on the looper 32', a blade or deflector 33 below the throat plate 34 is linearly moved from the position shown in Figs. 7 and 10 into the position shown in Figs. 9 and 11 to deflect the diverging legs of said loop l. The deflector 33 is provided with a slot 35 (Fig. 10) of a width substantially equal to the thickness of the needle thread t, and a wedge-shaped notch 36 which leads into the slot 35. Hence, on movement of the deflector 33 from the position shown in Fig. 7 into that shown in Fig. 9, the two legs of the loop l are guided toward the slot 35 by the notch 36 and enter said slot one behind the other. In the present instance, the deflector 33 is so coordinated with the looper 32' that the slot 35 in said deflector is in line with the rear leg $l^x$ of the loop $l$ so that, on movement of said deflector from the position shown in Figs. 7 and 10 into that shown in Figs. 9 and 11, said leg $l^x$ enters said slot 35 without engaging a wall of the V-shaped notch 36, while the front leg $l^y$ of the loop $l$ is cammed into the slot 35 by the wall 36' of the V-shaped notch 36. Consequently, the rear leg $l^x$ of the loop $l$ will enter the slot 35 before the front leg $l^y$ is cammed thereinto, with the result that the portions of these legs which extend from the deflector 33 substantially to the material W become superposed with the front leg $l^y$ nearest the material W (Figs. 8 and 9). Since the loop $l$ is being distended while being deflected, and since the conventional needle thread tension devices of the machine resist with considerable force the drawing of needle thread through the needle while the loop $l$ is being deflected as described, the distending loop $l$ will draw thread from the preceding loop $l'$ (Figs. 7 and 8) until the latter is drawn tight. The rear wall 38 of the slot 35 in the deflector 33 is rounded as shown in Figs. 7 to 9 so as to avoid chafing the thread of the distending loop $l$. In order to permit the contracting loop $l'$ to close as tightly as possible about the legs of the loop $l$ when the latter is being distended (Figs. 5 and 9), the deflector 33 brings the legs of the loop $l$ preferably as closely as possible to the convergence C of the legs of the preceding loop $l'$ (Figs. 9 and 11). To this end, the deflector 33 is arranged to deflect the legs of the loop $l$ as closely as possible to the material W (Fig. 9), the deflected legs of the loop being received in a cut-away portion 39 of the throat plate 34. To the same end, the deflector 33 is moved in such a direction that the legs of the loop $l$ between the deflector and the material (Fig. 11) pass the convergence C of the legs of the loop $l'$ as closely as possible so that said loop $l'$ may contract into firm wedging engagement with the legs of the loop $l$ without undue restraint from the latter. The contracting loop $l'$, through intermediation of the legs $l^x$ and $l^y$ of the loop $l$, also draws the loop $l''$, which immediately precedes the loop $l'$, firmly against the material W (Figs. 3 and 9). Shortly before the deflector 33 reaches the most advanced position shown in Fig. 9, the same brings the rear leg $l^x$ of the loop $l$ into engagement with a knife 40 on the looper 32' (Figs. 9 and 11), whereupon said leg is severed as at 41. On subsequent removal of the material W from the machine, the severed portion of the loop $l$ which is continuous with the needle thread is withdrawn from the material, leaving the severed rear leg $l^x$ of said loop $l$ anchored between the loops $l'$ and $l''$ (Figs. 4 and 6). The pull exerted by the distending loop $l$ on the thread of the preceding loop $l'$ is so great that the thread of said loop $l$ as well as of the loop $l'$ is stretched within the limit of its resiliency, and the contracted loop $l'$ draws the loop $l$ against the loop $l''$ with such force that the engaged portions of said loops are considerably deformed and constricted (Figs. 3 and 5). The thread of the contracted loop $l'$ is in fact stretched to such an extent that the withdrawal therefrom of the severed end of the loop $l$ does not cause any noticeable relaxation of its firm grip on the remaining portion of the severed loop $l$, the loop $l'$ having sufficient resiliency to contract and hold the adjacent portion of the remainder of the severed loop $l$ deformed and constricted as shown in Figs. 4 and 6.

That the loop $l'$ is under permanent tension and does not noticeably relax its firm grip on the severed loop $l$, even after the withdrawal of the severed end thereof, is evidenced by a very marked cross-sectional constriction of the leg $l^x$ between the loop $l'$ and the material W (Fig. 4) as observed under a microscope. As also observed under the microscope, the cross-over leg $l^z$ of the last stitch is partly embedded in the material W (Fig. 4) in consequence of the permanent tension in the thread of said last stitch. The tied chain stitch shown in Figs. 4 and 6 has defied all ordinary efforts to unravel or even loosen the same, wherefore said stitch serves as, and is in fact, a novel tying stitch which is as well secured against unravelling as a conventional tying stitch.

Whereas the described deflector 33 has a provision (narrow slot 35) for forcing the deflected legs of the loop $l$ into superposed relation along the material W (Fig. 9), a modified deflector 45 (Fig. 12) merely forces the diverging legs of the loop $l$ together. To this end, the deflector 45 has a wedge-shaped notch 46 the bottom 47 of which is rounded. On movement of the deflector 45 in the direction of the arrow 48 in Fig. 12, the diverging legs of the loop $l$ on the looper 32' will, besides being deflected, also be forced into side-by-side engagement with one another by the rounded bottom 47 of the notch 46, resulting in the disposition of the legs of the loop $l$ in the contracted loop $l'$ as shown in Fig. 13. After severance of the loop $l$ and withdrawal of the severed end thereof from the contracted loop $l'$, the remaining end the severed loop is wedged against the contracted loop $l'$ (Fig. 14) and against the preceding loop $l''$ in much the same fashion as shown in Figs. 4 and 6.

Fig. 15 shows the novel tying stitch applied at the end of a straight seam of chain stitches 50, the contracted loop 51 of the last stitch firmly wedging the remaining end 52 of the last severed loop against the loop 53 which immediately precedes the loop 51. In view of the preceding, detailed description of the formation of the novel tying stitch at the end of a zig-zag seam of chain stitches, the formation of the same tying stitch at the end of a straight seam of chain stitches is too obvious to require further explanation.

Figs. 16 and 17 disclose a modified mode of tying the last one of a series of chain stitches. The machine used for forming these stitches may be like the one used for forming the stitches 30 in Fig. 1, and comprise a reciprocatory and vibratory needle (not shown) carrying needle thread $t$, and a pair of alternately operative loopers of which one is shown at 55. After the sewing instrumentalities of the machine come to rest with the needle retracted and the looper 55 in the position shown in Fig. 16 and holding the last loop 56, a deflector 57 underneath the throat plate 58 is moved in the direction of the arrow 59 in Fig. 18 to deflect the front leg 56' in the manner best shown in Fig. 17, thereby distending the loop 56. The deflected leg 56' of the distending loop 56 forces the preceding loop 60 against the material W and the convergence of the legs of the loop 56. The distending loop 56, being unable to draw needle thread through the needle thread tension devices (not shown) of the machine, must draw thread from the preceding loops 60 and 61. Since the loop 60 is prevented from contracting by the deflected leg 56' of the last loop 56 (Fig. 17), the latter will draw thread from the loop 61 which immediately precedes the loop 60. The ensuing contraction of the loop 61 draws the loop 60 into firm wedging engagement with the material W and the convergence of the legs of the loop 56 and at the same time forces said loop 61 toward the convergence of the legs of the last loop 56 (Fig. 17), so that, after severance of the last loop 56 and withdrawal of the severed end of said loop from the material, the end of the severed loop remaining in the material is held fairly securely between the loops 60 and 61. The deflector 57 has preferably an inclined cutting edge 62 (Fig. 18) which engages and severs the rear leg 56'' of the loop 56 as at 63 when the front leg 56' thereof is deflected as shown in Figs. 17 and 18. A last stitch tied in this fashion, while not as firmly secured as the previously described stitch shown in Fig. 4, for instance, is nevertheless satisfactory for many purposes.

Fig. 19 shows an example of a machine which may be equipped with mechanism to form the novel tying stitch shown in Figs. 4 and 6, for instance. This machine is a button hole sewing machine of the type known as "straight hole" machine, described, for example, in U. S. Patents Nos. 714,284, November 25, 1902; 749,776, January 19, 1904; 1,088,652, February 24, 1914; 1,402,073, January 3, 1922, and 1,483,307, February 12, 1924. The machine comprises a bed 65 from which rises a standard 66, carrying an overhanging arm 67 spaced above the bed. The material or work W is carried by a work clamp or holder comprising a clamp plate 68 and cooperating clamping arms (not shown), said work holder being movable as a unit over the bed, by mechanism not shown, in order to position the stitches along the sides of the buttonhole. The stitch-forming instrumentalities comprise the previously mentioned, eye-pointed needle 31 above the work and cooperating loopers or equivalent under thread handling devices 32 below the work, the throat plate 34 being carried by the bed 65 and having an opening 70 through which the needle operates. The needle 31 is carried by a needle bar 71 which is longitudinally and vertically reciprocated, by means generally indicated at 72, in a needle bar guide 73, means (not shown) being provided for oscillating said needle bar alternately in opposite directions transversely to the direction of feed of the work clamp between successive strokes of the needle to position the depth stitches. The thread $t$ from a suitable source passes, through a take-up 74 and suitable tension devices (one being shown at 76), to the needle eye, whence it passes through the work and throat plate to the loopers 32. The present machine is power-operated and automatically stopped at the end of an operating cycle by stop-motion mechanism not shown herein but fully disclosed in my referred copending application Serial No. 523,173, filed February 21, 1944.

In accordance with the present invention, a loop deflector such as the deflector 33 in Figs. 9 and 10, for instance, is guided in ways in the bed 65 immediately below the throat plate 34 and between the latter and the loopers 32 (Fig. 19). At the completion of an operating cycle of the machine, and substantially coincidentally with the stopping of the machine, said deflector 33 is moved, by means to be described, from its normal retracted position shown in Fig. 19 to the left as viewed in said figure, to deflect, and thereby distend, the last loop $l$ which, at this time is held by one of the loopers 32 and extends from the work W about said looper to the needle 31 as shown in Fig. 9. The deflection and simultaneous distention of the loop $l$ by the deflector 33 results in the setting of the last stitch in the manner previously described and shown in Figs. 3 and 5. The looper which holds the last loop $l$ also preferably carries a knife or cutter 40' which may be like the cutter 40 on the looper 32' in Fig. 9 and severs the rear leg of the loop $l$ toward the end of its distention by the deflector 33. On subsequent removal of the material W from the machine and according withdrawal of the severed end of the loop $l$ from the material, the last stitch is completed, and this stitch is the same as, and has all the described characteristics of, the novel tying stitch shown in Figs. 4 and 6.

The deflector 33 is provided with a socket 111 (Fig. 19) to receive a rounded end 112 of an arm 113 which is fast on one end of a rock shaft 114, journalled in suitable bearings in the bed 65. The rock shaft 114 is, at the completion of an operating cycle of the machine, rocked counterclockwise as viewed in Fig. 19, by means fully disclosed in my referred copending application Serial No. 523,173, so that the deflector 33 will deflect, and thereby distend, the last formed loop $l$ (Fig. 9) in the manner previously described.

I claim:

1. A tying stitch for chain sewing in which the last-formed loop of the thread extends through the work and between the legs of the next to the last-formed loop, and, after emerging from the work, the free end of the thread passes first over one leg of the next to the last loop and then through the last loop, said last loop being drawn tight and pulling the free end against the next to the last loop and the work.

2. The method of forming a tying stitch at the end of a series of chain stitches which comprises extending the last loop and deflecting it in the general direction of the legs of the preceding loop and thereby tightening the preceding loop until the legs of the loop passing through the last loop are pinched against the last loop and the work and then severing one of the legs of said loop leaving a free end which passes through the last loop and is pinched against the last loop and the work.

3. The method of forming a tying stitch at the end of a series of chain stitches which comprises extending the last loop and deflecting it in the general direction of the legs of the preceding loop thereby tightening the preceding loop, and severing one leg of the last loop after the tightening has pinched the free end against the last loop and the work.

4. The method of forming a tying stitch at the end of a series of chain stitches in work in which the alternate needle holes are arranged in parallel rows which comprises extending the last loop and deflecting it in the general direction of the legs of the preceding loop and thereby tightening the preceding loop, until the legs of the loop passing through the last loop are pinched against the last loop and the work, and then severing one of the legs of said loop leaving a free end which passes through the last loop and is pinched against the last loop and the work.

JOSEPH H. PIKUL.